United States Patent Office 3,350,366
Patented Oct. 31, 1967

3,350,366
CROSS-LINKING OF POLYMERIC N-VINYL LACTAMS, POLYMERIC VINYL ESTERS AND POLYMERIC ACRYLATE ESTERS WITH ALPHA-OMEGA ALIPHATIC DIOLEFINS
Ashot Merijan, Rahway, N.J., assignor to General Aniline & Film Corporation, New York, N.Y., a corporation of Delaware
No Drawing. Filed Nov. 17, 1964, Ser. No. 411,697
17 Claims. (Cl. 260—78)

This invention relates to a new process of cross-linking polymeric N-vinyl lactams, polymeric vinyl esters, and polymeric acrylate esters with alpha, omega-diolefins in the presence of a dialkyl peroxide.

I have discovered that polymeric N-vinyl lactams, polymeric vinyl esters, and polymeric acrylate esters are readily cross-linked to any desirable extent by an alpha, omega-diolefin in the presence of a tertiary alkyl peroxide or hydroperoxide by either varying the relative concentration of the diolefin or the reaction time to yield products with a wide range of solubilities to totally insoluble gels or resins. In carrying out the cross-linking process, a mixture consisting of 1 mole of a polymeric N-vinyl lactam, polymeric vinyl ester or polymeric acrylate ester and from 0.02 to 0.3 moles of at least one alpha, omega-diolefin in solution of an organic solvent common to the polymer and alpha, omega-diolefin is heated at a temperature ranging from 100° to 200° C. in the presence of 0.05 to 1.0 mole of peroxide per mole of alpha, omega-diolefin for a period of time ranging from 1 to 30 hours. The resulting product may be employed as such or, if desired, the organic solvent removed by vacuum distillation. Cross-linked polymeric N-vinyl lactams may be obtained which are soluble in a wide variety of different solvents such as alcohols, ether-alcohols, amines and other polar organic solvents, partially soluble in said solvents to insoluble gels or resins. The cross-linked polymeric vinyl and acrylate esters yield products which are partially soluble in ketones, esters, alcohols, etc., and swell in hydrocarbons to insoluble gels or resins.

When employing lower boiling alcohols as solvent, the cross-linking is conducted in a stainless steel rocker bomb. In such case the dialkyl peroxide catalyst and the solution of the polymeric N-vinyl lactam, polymeric vinyl ester, or polymeric acrylate ester and alpha, omega-diolefin is placed into a stainless steel rocker bomb and the bomb heated and maintained at a temperature of from 100° to 200° C. for a period of time ranging from 1 to 30 hours. The pressure developed in the bomb may range from 10 to 500 p.s.i.g. After cooling to room temperature the contents of the bomb are discharged or, if desired, the organic solvent removed by vacuum distillation.

The homopolymers of N-vinyl lactams which are cross-linked with an alpha, omega-diolefin in accordance with the present invention are characterized by the following formula:

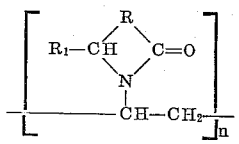

wherein R represents an alkylene bridge group, i.e.,

—CH$_2$—CH$_2$—, —CH$_2$—CH$_2$—CH$_2$ and —CH$_2$—CH$_2$—CH$_2$—CH$_2$ to complete a 5, 6 and 7-membered heterocyclic ring system, $R_1$ represents either hydrogen or methyl group, and $n$ represents a number indicative of the extent of polymerization. The polymeric N-vinyl lactams are obtained by polymerizing N-vinyl 5, 6 and 7-membered ring compounds such as, for example, N-vinyl-2-pyrrolidone, N-vinyl-5-methyl-2-pyrrolidone, N-vinyl-2-piperidone, N-vinyl-6-methyl-2-piperidone, N-vinyl-ε-caprolactam and N-vinyl-7-methyl-ε-caprolactam. Comparable homopolymers are available from the corresponding thiolactams and these can be used in the process. Relative viscosity measurements are used as an indication of the average molecular weight of the polymers which are characterized by a chain of carbon atoms to which the lactam rings are attached through their nitrogen atoms:

The viscosity coefficient K (K value), which is described in Modern Plastics, 23, No. 3, 157–61, 212, 214, 216, 218 (1945) is calculated from the relative viscosity of a 1.00% aqueous solution (or in other solvents such as alcohols, ketones, benzene, etc.) using the following equation:

$$\log \eta \text{ rel} = \frac{75 K_0^2}{1 + 1.5 K_0 c} + K_0$$

where $c$=conc. in g./100 ml. of solution; $\eta$ rel=ratio of solution viscosity/solvent viscosity; and $K=1000 K_0$.

For the purpose of the present invention I employ homopolymers of N-vinyl lactams having a K value of 10 to 140, preferably of 30 to 100 because of their viscosity at lower concentrations. The homopolymers are readily prepared by the procedural steps given in United States Patents 2,265,450, 2,317,804 and 2,335,454 in which working examples of some of the species characterized by the above formula are given and all of which are incorporated herein by reference thereto.

All of the homopolymers of N-vinyl lactams characterized by the foregoing general formula are soluble in water and in the organic solvents of the type hereinafter mentioned.

Instead of employing homopolymers of N-vinyl lactams I also employ copolymers prepared from about 5 to 95% by weight of N-vinyl lactam and from about 95 to 5% by weight of any heterocyclic monomer containing a polymerizable vinyl group such as for example, N-vinyl imidazole, N-vinyl-3-morpholinone; N-vinyl oxazolidone, N-vinyl succinimide, N-vinyl glutarimide, N-vinyl-di-glycolylimide; vinyl esters, e.g., non-heterocyclic polymerizable monomer such as for example, vinyl acetate, vinyl methoxy-acetate, vinyl diethylacetate, vinyl trimethylacetate, vinyl propionate, vinyl isobutyrate, vinyl butyrate, vinyl lactate, vinyl caproate, vinyl caprylate, vinyl stearate, etc.; methacrylic monomers such as methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, β-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-α-chloro-acrylate, ethyl-α-chloro acrylate, phenyl-α-chloro acrylate; α-ethylacrylic acid, acrylic acid, methacrylic acid, etc.; acrylonitrile, methacrylonitrile, acrylamide, methacrylamide, as well as N-alkyl and N-aryl substituted acrylamides and the like.

The homopolymers of acrylate esters which are cross-linked in accordance with the present invention are characterized by the following formula:

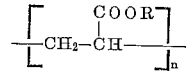

wherein R represents either a straight or branched alkyl of from 1 to 18 carbon atoms or an alkoxyalkylene in which the total number of carbon atoms in the alkylene groups range from 2 to 4, and $n$ represents a number indicative of the extent of polymerization as determined by the aforementioned viscosity measurements. The molecular weight of such homopolymers range from 10,000 to 1,000,000. As examples of such acrylate esters, the following are illustrative:

Acrylate

| | |
|---|---|
| Methyl | Heptyl |
| Ethyl | 2-heptyl |
| Propyl | Octyl |
| Isopropyl | 2-octyl |
| Butyl | Nonyl |
| Isobutyl | 5-ethyl-2-nonyl |
| s-Butyl | Decyl |
| 2-methyl-1-butyl | 2-methyl-7-ethyl-4-undecyl |
| 3-methyl-1-butyl | Dodecyl |
| 2-ethyl-1-butyl | Tetradecyl |
| Amyl | Hexadecyl |
| 3-pentyl | Octadecyl |
| 2-methyl-1-pentyl | 2-methoxyethyl |
| 4-methyl-2-pentyl | 2-ethoxyethyl |
| Hexyl | 2-butoxyethyl |
| 2-ethylhexyl | |

Any one of the above illustrative acrylate ester monomers may be copolymerized with from 5 to 95% by weight of a different acrylate ester monomer or from 95 to 5% by weight of the aforementioned N-vinyl 5, 6 or 7-membered lactam or a monomer containing a polymerizable vinyl group of the type hereinbefore referred to under copolymers of N-vinyl lactams.

Homopolymers of vinyl esters ranging from vinyl acetate to vinyl stearate and copolymers prepared by the copolymerization of 5 to 95% by weight of a vinyl ester of the type referred to above with 95% to 5% weight of any non-heterocyclic polymerizable monomer referred to above are also readily cross-linked.

Since commercially available polyacrylic esters are insoluble in water and alcohols, I prefer to homopolymerize an acrylate ester monomer or copolymerize such monomer either with a monomeric N-vinyl lactam or any one of the aforementioned monomers containing a polymerizable vinyl group, including a mixture of two different acrylate ester monomers, in an organic solvent common to the monomer or comonomer mixture and alpha, omega-diolefin in the presence of any conventional polymerization catalyst such as azobisisobutyronitrile and the like. After the monomer or comonomer mixture has been substantially polymerized, which normally requires a period of time ranging from 1 to 30 hours as indicated by the percent of free monomer or comonomer in the polymerization reaction mixture which ranges from zero to about 1% by weight, there is added a sufficient amount of alpha, omega-diolefin and peroxide and the cross-linking reaction conducted. By this polymerization and cross-linking procedure all monomers and comonomers within the ambit of the present invention may be polymerized and cross-linked to various degrees yielding products with a wide range of solubilities to products which are totally gelled and insoluble in any of the common solvents.

Instead polymerizing the monomer or comonomer mixture followed by cross-linking the polymer, simultaneous polymerization and cross-linking may be resorted to by simply charging the reaction vessel with a solution of the monomer or mixture of monomers, alpha, omega-diolefin and dialkyl peroxide in the aforementioned proportions and in the aforementioned organic solvent. The reaction vessel is purged with nitrogen and heated to a temperature ranging from about 100° to 200° C. for a period of time ranging from 1 to 30 hours. The shorter the reaction time, the lower the degree of cross-linking is obtained to the extent that the partially cross-linked polymer is soluble in the same organic solvent utilized in the simultaneous polymerization and cross-linking reaction. The longer the time, the greater degree of cross-linking is obtained yielding lumpy gels which drop out of solution of the organic solvent.

Any alpha, omega-diolefin having a molecular weight from about 68 to about 280 may be employed in the cross-linking of homo- and co-polymers of N-vinyl lactams homo- and co-polymers of vinyl esters and homo- and co-polymers of acrylate esters. In other words, alpha, omega-diolefins ranging from 1,4-pentadiene, 1,5-hexadiene, 1,6-heptadiene, 2-methyl-1,5-hexadiene, 1,7-octadiene, 2-methyl-1,7-octadiene, 1,8-nonadiene, 1,9-decadiene, 1,14-pentadecadiene to 1,17-octadecadiene may be employed. In this connection, it is to be noted that the alpha, omega-diolefin may be either a straight chain or a branched chain, all of which function as cross-linking agents, the only requirements being that said diolefin contain an ethylenic unsaturation at the first and at the last carbon atom of the chain. Instead of employing a single alpha, omega, omega-diolefin, a mixture of two or more of such diolefins may be used as will be shown hereinafter.

In carrying out the cross-linking reaction it is desirable to employ an organic solvent common to the alpha, omega-diolefin, the homo- and co-polymers of N-vinyl lactams, vinyl esters and of acrylate esters as well as to the individual monomers or a mixture of comonomers. As solvents I found that various alcohols such as methanol, ethanol, propanol, isopropanol, butanol, secbutanol, amyl alcohol, hexanol, 2-ethyl-1-hexanol, ethylene glycol, 1,2-butanediol, 1,4-butanediol, etc. are satisfactory. Other solvents such as diacetone alcohol, diethylene glycol, ethylene glycol monomethyl ether acetate, methylene chloride and the like may also be employed. It is to be noted that the nature or character of the organic solvent is immaterial so long as it is a liquid under reaction conditions, forms a solution with the homopolymer, copolymer, the monomer or a monomer mixture and alpha, omega-diolefin. The amount of organic solvent employed is not critical. Any amount which will yield a solution of these reactants will suffice. However, for purposes of expediency, I found that for every part by weight of solid homopolymer or copolymer from 1 to 10 parts of organic solvent either by volume or by weight are sufficient to yield a workable solution during the initial cross-linking reaction.

As a peroxide catalyst (initiator of the cross-linking reaction), I can employ any one of the known tertiary-alkyl organic peroxides such as, for example, t-butyl hydro-peroxide, di-t-butyl peroxide, t-butyl perbenzoate, di-ti-butyl perphthalate, t-butyl-pentamethylethyl peroxide, t-butyl-triphenylmethyl peroxide, di-t-amyl peroxide, bis-(triethylmethyl) peroxide, bis-(triphenylmethyl) peroxide, 2,5-dimethylhexyl - 2,5-dihydroperoxide, 2,5-dimethyl-2,5-di(t-butyl peroxy) hexane, 2,5-dimethylhexyl-2,5-di(peroxy benzoate), and the like.

Where a moderately cross-linked homopolymer or copolymer of an N-vinyl lactam is desired, the cross-linking reaction time is carefully controlled by intermittently withdrawing a small sample from the reaction mixture and determining its viscosity. In other words, when the K value of the homopolymer or copolymer is known, the cross-linking reaction is initiated and every 1-2 hours a sample withdrawn, cooled to room temperature and its viscosity determined with a Brookfield Synchro-Electric Viscosimeter, Model LVF. When the desired degree of cross-linking has been attained or indicated by the increase in viscosity, the cross-linking reaction is discontinued and cooled to room temperature.

In the case where homopolymers and copolymers of vinyl esters and of acrylate esters are first prepared in solution of the organic solvent, the viscosity of the resulting polymer is determined prior to cross-linking. After cross-linking has been initiated, a small sample is withdrawn from the reaction mixture every 1-2 hours and its viscosity determined, as above, until the desired degree of cross-linking has been attained.

More heavily cross-linked homopolymers and copolymers are obtained by permitting the cross-linking reaction to proceed until gelling begins to occur as noted by the thickening of the solution.

Still more heavily cross-linked polymers are obtained by permitting the cross-linking reaction to proceed until the viscous reaction mixture begins to climb the agitator and turn into lumps of insoluble gel or resin which will drop out of solution of the organic solvent.

EXAMPLE I

Into a one-liter, four-necked flask equipped with stirrer, thermometer, nitrogen inlet and reflux condenser, the following ingredients were charged: Polyvinylpyrrolidone having a K value of 30=56 grams (0.5 mole). N-butanol=200 mls.

The flask was then purged with nitrogen and the contents heated and stirred until a homogenous solution was obtained. To the solution was then added 10 grams (0.091 mole) of 1,7-octadiene, 5.0 grams (0.034 mole) of di-t-butyl peroxide and the contents were further heated and maintained at reflux (118°–124° C. pot temperature). Within one-half hour at reflux, the solution had become very viscous and continued becoming thicker with continued heating. At the completion of 4 hours of reflux, the contents started climbing the agitator and turning into lumps of insoluble gel which dropped out of solution.

EXAMPLE II

Into a similar flask as described in Example I, the following ingredients were charged: Polyvinylpyrrolidone having a K value of 90=56 grams (0.5 mole). Methyl isobutyl carbinol=200 grams.

The mixture was heated and stirred until a complete solution was obtained. Then to this solution (at 60°–70° C.), the following components were added and heated to reflux: 1,7-octadiene=10 grams (0.09 mole). Di-t-butyl peroxide=5.0 grams (0.034 mole).

The solution had been maintained at reflux for 2 hours when the contents gelled into insoluble lumps making the agitation impossible.

EXAMPLE III

Into a one-liter, stainless steel rocker bomb, equipped with a thermocouple and heating coil, the following ingredients were charged: 50% ethanol solution of 60/40% by weight of N-vinyl-2-pyrrolidone/vinyl acetate copolymer=400 grams. 1,7-octadiene=20 grams (0.18 mole). t-Butyl-perbenzoate=10 grams (.051 mole).

The bomb was then sealed, rocked and heated. It was maintained at 115°–130° C. for six hours and then cooled to room temperature and the cap taken off. The contents had turned to a very viscous mass with lumps of rubbery gels which would not pour. It had to be pulled out of the bomb.

EXAMPLE IV

Into a similar apparatus as described in Example I, the following ingredients were charged: Ethyl acrylate=100.0 grams (1.0 mole). Methyl isobutyl carbinol=160 grams. Azobisisobutyronitrile=0.4 gram.

The flask was then thoroughly purged with nitrogen, heated and maintained at 80–100° C. After four hours a sample was withdrawn and analyzed and found to contain only 0.08% ethyl acrylate by weight corresponding to 0.2 gram of the monomer. Then to the clear solution was added 10.0 grams (0.091 mole) of 1,7-octadiene and 5.0 grams (0.034 mole) of di-t-butyl peroxide. The resulting solution was heated and maintained at 120–125° C. Within one hour the solution became viscous with the appearance of gelatin. After five hours the contents turned into a mass of gelled lumps that made agitation impossible. The cross-linked polymer thus obtained was a rubbery resin that had to be drawn out.

EXAMPLE V

Into a similar apparatus as described in Example I, the following ingredients were charged: N-vinyl-2-piperidone=50 grams (0.4 mole). 2-ethylhexylacrylate=50 grams (0.54 mole). n-Butanol=200 grams. Azobisisobutyronitrile=0.2 gram.

The flask was then purged with nitrogen thoroughly and heated to reflux (pot temperature 118–125° C.). After two hours of reflux an additional 0.3 gram of the azo catalyst was added and refluxing continued for six more hours and then the resulting solution analyzed. The solution contained no acrylate monomer and only 0.12% by weight as N-vinyl piperidone corresponding to 0.48 gram. The solution was then slightly cooled and the following components added and heated back to reflux: 1,7-octadiene=5.0 grams (0.045 mole). Di-t-butyl peroxide=5.0 grams (0.034 mole).

Within two hours the solution became very viscous but stayed clear and agitable. When another 5.0 grams of each of the octadiene and the peroxide were added and the solution continued to reflux, the contents turned into a massive gel within another two hours.

EXAMPLE VI

Into a similar apparatus as described in Example I, the following ingredients were charged: N-vinyl-2-pyrrolidone=111 grams (1.0 mole). Hexanol=150 grams. 1,7-octadiene=15 grams (0.136 mole). Di-t-butyl peroxide=10 grams (0.068 mole).

The flask was then purged with nitrogen, heated and maintained at 125–140° C. The solution became thicker as the reaction continued and within three hours the contents started climbing the agitator as one big mass. At this point 100 more mls. of hexanol were added and a viscous but stirrable solution was obtained. The contents were heated back to the reaction conditions. After one-half hour, the contents started gelling and forming insoluble lumps.

EXAMPLE VII

Into a similar apparatus as described in Example I, the following ingredients were charged: Ethyl acrylate=100 grams (1.0 mole). Hexanol=200 grams. 1,7-octadiene=15 grams (0.136 mole). Di-t-butyl peroxide=11 grams (0.075 mole).

The flask was thoroughly purged with nitrogen and the solution heated and maintained at 125–135° C. Within 2½ hours the contents gelled into lumps which dropped out of solution.

EXAMPLE VIII

Into a similar apparatus as described in Example I, after a thorough nitrogen purge, the following ingredients were charged: Polyvinylpyrrolidone having a K value of 30=200.0 grams (1.8 moles). Methyl isobutyl carbinol=400 mls. (325 grams). 1,7-octadiene=30.0 grams (0.272 mole). Di-t-butyl peroxide=15.0 grams (0.1 mole).

The contents were then heated and maintained at reflux (113–120° C.) with occasional samplings for viscosity measurements. The results are as follows: Reaction time in hours: 0, 1.5, 2.5, 8.5, 13.5. Viscosity, cps. (25° C.): 560, 900, 1220, 4100, gel.

EXAMPLE IX

Into a similar apparatus as described in Example I, after a thorough nitrogen purge, the following ingredients were charged: N-vinyl-2-pyrrolidone=111.0 grams (1.0 mole). Methyl isobutyl carbinol=200 mls. (162 grams). P.P. Chevron $C_{15-20}$ α-olefins *=244.0 grams (1.0 mole).

---
*The P.P. Chevron $C_{15-20}$ α-olefins are pilot plant produced and contain 5.0 wt. percent α, β-diolefins in the same carbon range ($C_{15-20}$). Therefore, the 244.0 grams of the P.P. Chevron $C_{15-20}$ α-olefins (average m.w. 244) contain 12.2 grams (0.05 mole) of the $C_{15-20}$ alpha, omega-diolefins which act as the cross-linking agent in this process.

2,5 - dimethyl - 2,5 - di (t-butyl (peroxy) hexane=15.0 grams (0.051 mole).

The contents were then heated and maintained at 135–150° C. The solution continuously became thicker as the reaction proceeded and finally gelled after 3½ hours.

Since the properties of the homopolymers and copolymers will change with the degree of cross-linking, the moderately cross-linked polymers, prepared as above, retain their solubility in the solvents in which they were previously soluble and are useful as thickeners, protective colloids and flocculants. The more heavily cross-linked homopolymers and copolymers swell greatly but do not dissolve in alcohols, ketones, esters, hydrocarbons, etc. They are particularly useful for absorbing various solutions. For example, a gel swollen with aqueous mineral acid has proven useful in oil well acidizing.

Still more heavily cross-linked homopolymers and copolymers, prepared as above, are mechanically stronger and swell less. The homopolymers and copolymers of N-vinyl lactams are particularly useful in removing tannins from beer and wine and phenols from various solutions.

I claim:

1. The process of cross-linking polymers selected from the class consisting of polymeric N-vinyl lactams, polymeric vinyl esters, and polymeric acrylate esters which comprises heating one mole of said polymer with 0.02 to 0.3 mole of at least one alpha, omega-diolefin having a molecular weight of from 68 to about 280 in solution of an organic solvent common to said polymeric N-vinyl lactam, polymeric acrylate ester and alpha, omega-diolefin in the presence of 0.05 to 1.0 mole of an organic peroxide per mole of said diolefin at a temperature of about 100° to 200° C.

2. The process of cross-linking a polymer of N-vinyl lactam which comprises heating one mole of said polymer with 0.02 to 0.3 mole of at least one alpha, omega-diolefin having a molecular weight of from 68 to about 280 in solution of an organic solvent common to said polymeric N-vinyl lactam and alpha, omega-diolefin in the presence of 0.05 to 1.0 mole of organic peroxide per mole of said diolefin at a temperature of about 100° to 200° C.

3. The process of cross-linking a polymer of an acrylate ester which comprises heating one mole of said polymer with 0.02 to 0.3 mole of at least one alpha, omega-diolefin having a molecular weight of from 68 to about 280 in solution of an organic solvent common to said polymeric acrylate ester and alpha, omega-diolefin in the presence of 0.05 to 1.0 mole of an organic peroxide per mole of said diolefin at a temperature of about 100° to 200° C.

4. The process of cross-linking a polymer of a vinyl ester which comprises heating one mole of said polymer with 0.02 to 0.3 mole of at least one omega-diolefin having a molecular weight of from 68 to about 280 in solution of an organic solvent common to said polymeric acrylate ester and alpha, omega-diolefin in the presence of 0.05 to 1.0 mole of an organic peroxide per mole of said diolefin at a temperature of about 100° to 200° C.

5. The process of cross-linking polyvinyl-2-pyrrolidone which comprises heating one mole of said pyrrolidone with 0.18 mole of 1,7-octadiene in solution of n-butanol in the presence of 0.068 mole of di-t-butyl peroxide at reflux.

6. The process of cross-linking a copolymer of 60% by weight of N-vinyl-2-pyrrolidone and 40% by weight of vinyl acetate which comprises heating about one mole of said copolymer with 0.18 mole of 1,7-octadiene in solution of ethanol in the presence of 0.05 mole of t-butyl perbenzoate at a temperature of 115°–130° C.

7. The process of cross-linking a polymer of ethyl acrylate which comprises heating 1 mole of poly(ethylacrylate) with 0.091 mole of 1,7-octadiene in solution of methyl isobutyl carbinol in the presence of 0.034 mole of di-t-butyl peroxide at a temperature of 120°–125° C.

8. The process of cross-linking a copolymer of N-vinyl-2-piperidone and 2-ethylhexylacrylate which comprises heating about one mole of copolymer containing 50% by weight of N-vinyl-2-piperidone and 50% by weight of 2-ethylhexylacrylate with 0.045 mole of 1,7-octadiene in solution of n-butanol in the presence of 0.034 mole of di-t-butyl peroxide at reflux.

9. The process of cross-linking the polymer of N-vinyl-2-pyrrolidone which comprises heating one mole of said polymer with 0.136 mole of 1,7-octadiene in solution of hexanol in the presence of 0.068 mole of di-t-butyl peroxide at a temperature of 125°–140° C.

10. The process of cross-linking the polymer of N-vinyl-2-pyrrolidone which comprises heating one mole of said polymer with 0.05 mole of a mixture of $C_{15-20}$ alpha, omega-diolefins in solution of methyl isobutyl carbinol in the presence of 0.051 mole of 2,5-dimethyl-2,5-di(t-butyl peroxy)hexane at a temperature of 135°–150° C.

11. The process of cross-linking the polymer of N-vinyl-2-pyrrolidone which comprises heating one mole of said polymer with 0.151 mole of 1,7-octadiene in solution of methyl isobutyl carbinol in the presence of 0.05 mole of di-t-butyl peroxide at a temperature of 113°–120° C.

12. The product prepared in accordance with the process of claim 1.

13. The product prepared in accordance with the process of claim 2.

14. The product prepared in accordance with the process of claim 3.

15. The product prepared in accordance with the process of claim 4.

16. The product prepared in accordance with the process of claim 5.

17. The product prepared in accordance with the process of claim 6.

No references cited.

JOSEPH L. SCHOFER, *Primary Examiner.*

S. M. LEVIN, *Assistant Examiner.*